Jan. 14, 1964  A. C. BUREAU  3,117,844
APPARATUS FOR CONTACTING FLUIDIZED SOLID PARTICLES WITH GAS
Filed Jan. 3, 1961

Inventor

ALFRED CHARLES BUREAU
By
Bailey, Stephens & Huettig
Attorneys

# United States Patent Office 3,117,844
Patented Jan. 14, 1964

3,117,844
APPARATUS FOR CONTACTING FLUIDIZED SOLID PARTICLES WITH GAS
Alfred Charles Bureau, London, England, assignor to The United Steel Companies Limited and Henry Balfour & Company Limited
Filed Jan. 3, 1961, Ser. No. 80,160
Claims priority, application Great Britain Jan. 4, 1960
7 Claims. (Cl. 23—260)

This invention relates to processes and apparatus for bringing about reactions between gases and fluidised solid particles, and treating the particles with another reacting gas which should not mix with the first. The invention is particularly applicable to the removal of hydrogen sulphide or other sulphur compounds from fuel gas by means of iron oxide or other oxide which is maintained in a hot fluidised state by the gas in one vessel and roasted in air in another vessel in order to regenerate it.

An object of the invention is to carry on the process under elevated pressure. While the two reacting gases should not be allowed to mix, it is of course necessary to transfer the solids from the one vessel to the other and back again, and in a plant maintained under pressure this involves difficulty. Not only may a gas pass through a closed pipe system from one vessel to the other under a small pressure difference, but also gas is commonly trapped by the solid particles and so carried from one vessel to the other.

Another object of the invention is to prevent the two cases from mixing with one another.

A further object is to provide an improved plant for use with elevated gas pressures.

Broadly in this invention a gas inert to the solid particles circulates in a closed circuit and in so doing fluidises some of the solid particles to form seals, and the particles in flowing from one vessel to the other and back again pass through these seals. The two reacting gases are thus isolated from one another by the seals.

The pressure in the two vessels should be kept as nearly as possible equal to one another, and the pressure in the closed circuit should be as nearly as possible the same.

Figure 1:
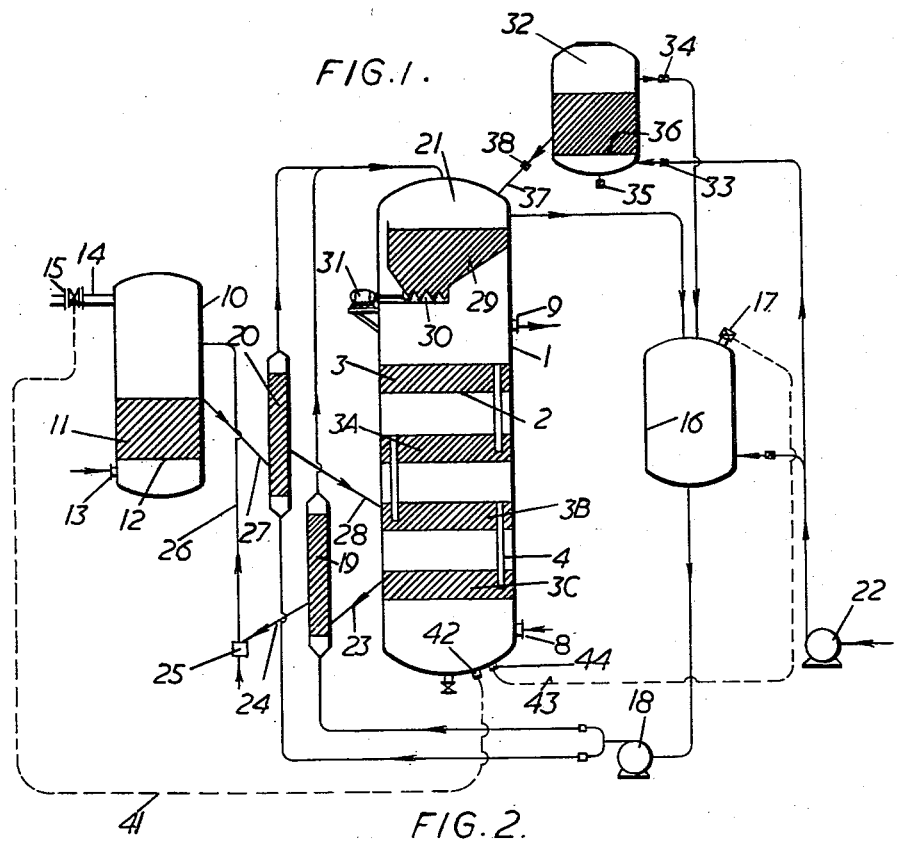
Figure 2:
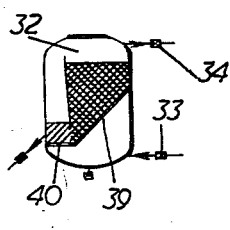

Further features of the invention will be explained in the following description of the preferred plant, which is shown diagrammatically in FIGURE 1 of the accompanying drawings, FIGURE 2 showing a minor modification.

In this plant, which is intended for use in the removal of hydrogen sulphide from industrial gas by reaction with particles of iron oxide, there is a reaction vessel 1 containing gas-permeable partitions 2 which serve to support four fluidised beds of oxide 3, 3A, 3B and 3C, the oxide being fluidised during operation and descending from one bed to another through vertical pipes 4 in the way well known in fluidising techniques. The gas to be purified by the removal of hydrogen sulphide is introduced through an inlet 8 under pressure, which may, for instance, be as low as 8 lbs. per square inch or as high as 600 lbs. per square inch or more, and flows upwards, fluidising the four beds as it does so, and leaves as purified gas through an outlet 9. The temperature in the vessel 1 may be, for instance, 660° F.

The greater part of the oxide forming the beds 3B and 3C is continuously circulated through a regenerator 10. The oxide forming the beds 3 and 3A is fresh oxide, used for the purpose described in the application of Lewis Reeve, Serial No. 790,751, filed February 2, 1959, and does not enter the oxide-circulation system until it reaches the bed 3B.

The regenerator 10 is constructed to hold a fluidised bed of oxide 11 on a support 12. Air under pressure enters it at 13 to flow up through and fluidise the bed 11, and leaves through an outlet 14 that contains a pressure-responsive valve 15. This valve is connected by a pressure pipe 41 to a pressure-responsive bulb 42 let into the vessel 1 and is adjusted so as to maintain substantially the same pressure in the regenerator 11 as in the vessel 1.

The inert-gas circuit provided according to the invention comprises a substantial reservoir 16 with a pressure-release valve 17, a pipe leading to a blower 18, parallel pipes connecting the blower 18 to two tubular vessels 19 and 20 and the vessels to a closed space 21 in the top of the vessel 1, and a pipe leading to the reservoir 16. The vessels 19 and 20 hold the oxide particles which form the seals. The reservoir is fed with make-up inert gas as required by a blower 22.

Oxide from the bed 3C flows under gravity through a pipe 23 into the vessel 19 and is there fluidised by the inert gas. From the vessel 19 oxide flows through a pipe 24 to an injector 25 in which it is picked up by air under pressure or by gas drawn from the outlet of the regenerator 10 and then carried through a pipe 26 into the regenerator 10, where the temperature may be, say, 1290° F. Regenerated oxide flows under gravity through a pipe 27 into the vessel 20 and is fluidised and carried upwards to the mouth of a pipe 28, from which it flows under gravity to the bed 3B.

If, for instance, the pipe 23 should become blocked the particles in the vesesl 19 will not fall below the level of the top of the pipe 24, so an effective seal will be maintained against air from the vessel 10 or the injector 25.

It is convenient to use the pressure of the gas to be purified as the master pressure and to control not only the pressure of the air by reference to it as described above, but also the pressure of the inert gas. For this purpose a pipe 43 in which the pressure varies with that in the vessel 1 runs from a bulb 44 let into the bottom of the vessel 1 to the valve 17, which may be of the diaphragm type, so that the pressure in the reservoir 16 is controlled by that in the vessel 1. The accuracy of the response of such pressure-controlled valves is normally within 1% of the total pressure. Any small variations in the pressures in the circuits will lead to changes in the heights of the fluidised particles forming the seals in the vessel 19 and 20.

The blower 22 is put under the automatic control of a pressure relay responsive to the pressure in the reservoir 16, and runs when fresh inert gas is required. The valve 17 ensures that the pressure in the inert gas circuit cannot exceed a predetermined figure.

Dust is carried out of the vessels 1 and 10 by the fluidising gases and collected in cyclones not shown. Fresh oxide is fed at a rate to make up the losses resulting from this removal of dust.

The fresh oxide particles are preferably introduced into the inert gas circuit and delivered from it into the upper part of the reaction vesesl through a seal formed by the particles themselves. As shown, the space 21 in the vessel 1 contains a feed hopper 29 for fresh oxide at the base of which there is a screw feeder 30 driven by a motor 31 outside the vessel. The space 21 is part of the inert-gas circuit, and is isolated from the gas in the vessel 1 except at the point where the screw feeder 30 discharges oxide into the vessel 1. Since the pressures of the inert gas in the space 21 and of the gas at the top of the vessel 1 are substantially balanced, the particles in the hopper 29 form an effective seal preventing gas passing from the space 21 to the vessel 1, or vice versa. Since the space 21 contains inert gas only, the only result of a leak at the gland through which the motor shaft passes into the vessel is escape of some of the inert gas.

To introduce the particles into the closed gas circuit, a feed vessel containing the fresh particles may advantageously be included in another inert-gas circuit connected in parallel with the main inert-gas circuit and normally under the same or substantially the same pressure so that the fresh particles can be introduced from the one circuit into the other when required, and yet by isolating the feed vessel when required particles can be supplied to it under atmospheric pressure. Such a feed vessel for charging the hopper 29 is shown at 32. This is a pressure vessel, isolatable by valves 33 and 34, into which a charge of oxide is introduced at atmospheric pressure through a top opening, which is thereafter closed. The valve 33 is in a pipe leading from the blower 22 and the valve 34 in a pipe leading to the reservoir 16. When the vessel 32 has been charged and closed, the valve 34 and an outlet valve 35 are opened so that air is driven out and replaced by inert gas from the reservoir 16. Then the valve 35 is closed and the valve 33 opened, so that the charge is fluidised on a support 36 in the vessel. When it is fluidised, it runs by gravity into the hopper 29 through a pipe 37 controlled by a valve 38.

If there are several reaction vessels working in parallel with a corresponding number of regenerators, the reservoir 16 may be common to all the associated closed circuits.

In the modifiction shown in FIGURE 2, the vessel 32 is internally shaped to form a hopper 39 with a short gas-permeable base 40. This presents the advantage that only a small part of the charge need be fluidised at once.

If the process carried on is such that the solid particles must be treated with three gases, the third gas can be isolated in the same way by seals formed by the particles themselves in another closed gas circuit in which an inert gas flows.

I claim:

1. A plant for use in a fluidised solids process comprising first and second reaction vessels each adapted to contain fluidised solids, means to pass one gas through the first reaction vessel and another gas through the second reaction vessel, means forming a closed circuit having two parallel branches for inert gas, said closed circuit being independent of said means for passing gasses through the reaction vessels, first and second tubular vesels one in each of the branches of said closed circuit for containing solid particles, means to circulate an inert gas through said closed circuit and upwardly through each of said tubular vessels to fluidise solid particles therein, a first connection for transferring particles from the first reaction vessel to the second one, a second connection for transferring particles from the second reaction vessel to the first reaction vessel, each said connection passing through a different one only of said tubular vesesls so that the fluidised particles in the tubular vessels form gas seals to prevent gas from passing from one reaction vessel to the other.

2. A plant as claimed in claim1 in which said outlets from the tubular vessels are located at points spaced above the lower ends thereof.

3. In a plant as claimed in claim 1, hopper means connected in the closed circuit for introducing fresh particles into one of the reaction vessels.

4. In a plant as claimed in claim 1, the point of inlet of each tubular vessel and the point of outlet therefrom being at different levels.

5. A plant as claimed in claim 3 in which a screw feeder with a driving shaft is provided at the base of the hopper and the driving shaft lies in the closed circuit and passes out of this through a gland.

6. A plant as claimed in claim 3 in which a feed vessel is connected through a valve to the closed circuit and means are provided for putting it under pressure to charge particles from it into the hopper with the valve to open.

7. A plant as claimed in claim 1 in which the inert gas circuit includes a substantial gas reservoir.

References Cited in the file of this patent

UNITED STATES PATENTS

| 2,422,793 | McAfee | June 24, 1947 |
| 2,909,424 | Jukkola | Oct. 20, 1959 |

FOREIGN PATENTS

| 708,972 | Great Britain | May 12, 1954 |